Nov. 29, 1966  B. W. GLOVER  3,288,515
MOBILE CONCESSION STAND
Filed Aug. 19, 1964  2 Sheets-Sheet 2

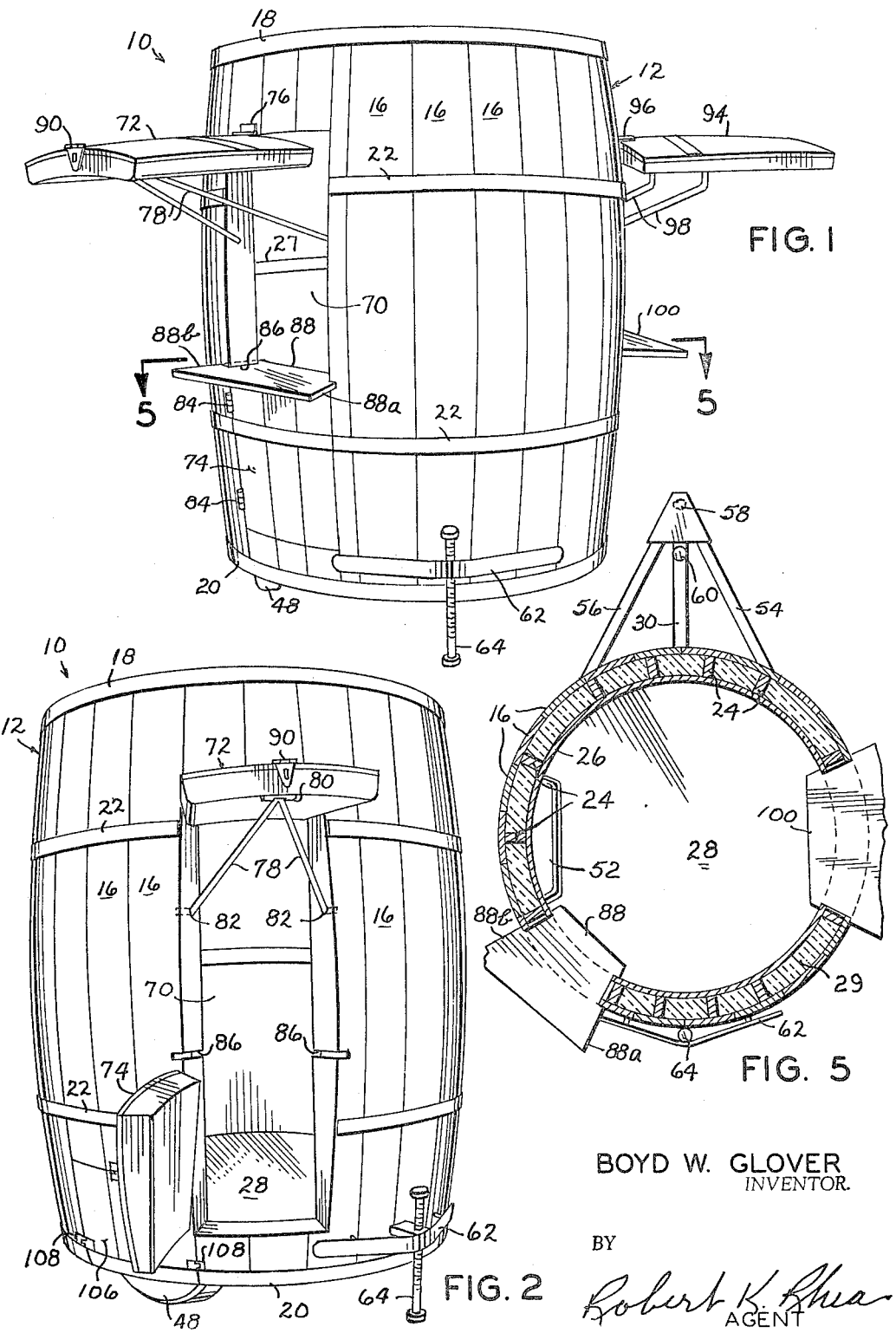

BOYD W. GLOVER
INVENTOR.

BY
Robert K. Rhea
AGENT

United States Patent Office 3,288,515
Patented Nov. 29, 1966

3,288,515
MOBILE CONCESSION STAND
Boyd W. Glover, 7001 S. Country Club Drive,
Oklahoma City, Okla.
Filed Aug. 19, 1964, Ser. No. 390,707
1 Claim. (Cl. 296—22)

The present invention relates to concession stands and more particularly to a trailer type concession stand which can be readily transported from place to place.

Concession stands of the trailer type have been used extensively. However, it is desirable that this type of trailer concession stand be as compact as possible to facilitate its transportation from place to place and for positioning the trailer adjacent the entrance to grandstands, or the like, where the available area for parking the trailer type stand is relatively small. It is further desirable in this type of trailer that the exterior be formed in such a manner that it is pleasing in appearance and will attract attention.

It is, therefore, the principal object of this invention to provide a mobile concession stand of the trailer type wherein the body portion of the stand is formed to depict the configuration of a wooden stave barrel.

Another object is to provide a concession stand which may be closed and locked to secure its contents.

An additional object is to provide a device of this type which has openings in its sides providing convenient dispensing platforms or counters for serving customers.

A still further object is to provide a trailer type stand having access doors in the body portion which may be folded to a closed position and the stand moved to another location by a towing vehicle.

Yet another object is to provide a trailer type stand containing facilities for dispensing soft drinks, ice cream and sandwiches, or the like, in which the various units are compactly assembled within the body of the stand so that all units are easily accessible to a single attendant.

The present invention accomplishes these and other objects by mounting a stand having the configuration of a barrel on a two wheel trailer frame. Hingedly connecting panels forming a part of the stand wall provide access and dispensing openings.

Other objects will be apparent from the following description when taken in conjunction with the accompanying two sheets of drawings, wherein:

FIGURE 1 is a rearward perspective view of the stand in operative position;

FIGURE 2 is a view similar to FIG. 1 looking into the access opening with its doors in opened position;

FIGURE 5 is a horizontal cross-sectional view, to a different scale, taken substantially along the line 5—5 of FIG. 1.

Like characters of reference designate like parts in those figures of the drawings in which they occur.

In the drawings:

Figure 3:
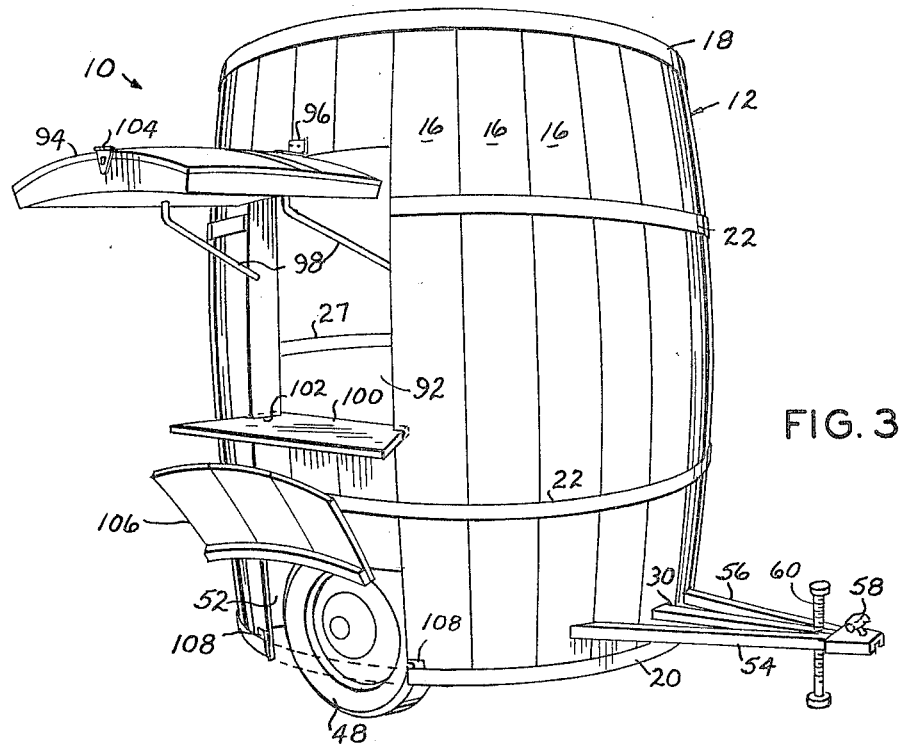
FIGURE 3 is a perspective view of the stand illustrating the other dispensing opening and one trailer wheel access panel in open position.

The reference numeral 10 indicates the device, as a whole, comprising a barrel-shaped body 12 mounted on a trailer frame 14. The outer wall of the body 12 is formed of a plurality of outwardly bowed staves 16 which form the barrel shape. The staves are surrounded by upper, lower and intermediate bands 18, 20 and 22, respectively, to complete the wooden-stave barrel appearance.

As shown in FIG. 5, a plurality of vertically disposed studs 24 define a substantially cylindrical inner wall 26 in spaced relation with respect to the staves 16. Inner bands, as at 27, further support the inner wall 26. Heat and cold insulating material 29 is placed between the studs 24, the staves 16 and inner wall 26. A bottom or floor 28 is horizontally connected to the inner wall 26 in upwardly spaced relation with respect to the depending end of the barrel body 12.

Figure 4:
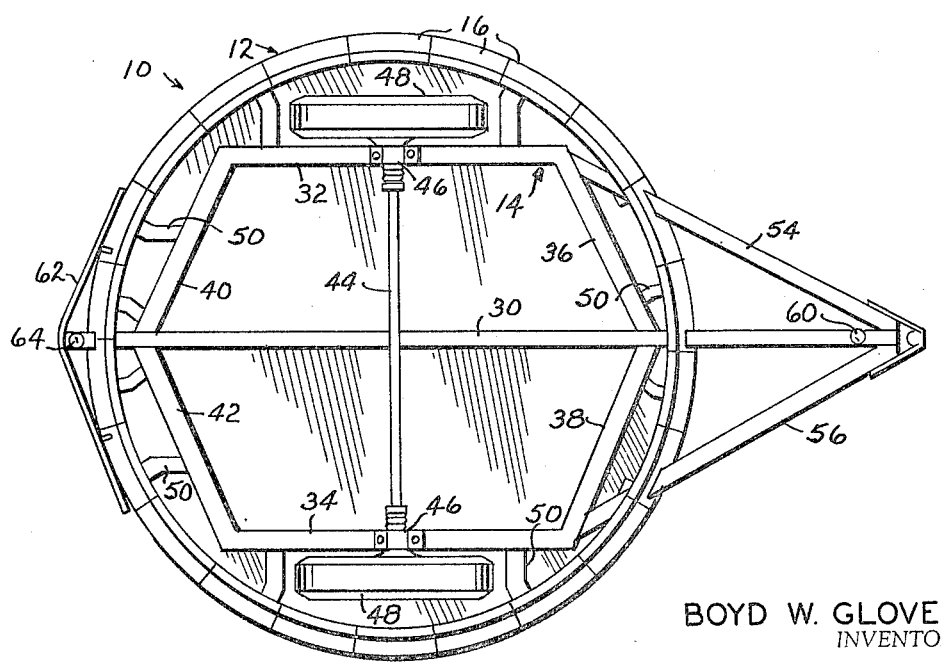
FIGURE 4 is a bottom view of the stand.

The trailer frame 14 is substantially hexagonal in overall configuration, as viewed in FIG. 4, and is composed of a central tongue member 30 extending diametrically across the lower end portion of the body 12 below the floor 28. Parallel side members 32 and 34 are connected in spaced relation with respect to the tongue 30 by forwardly and rearwardly converging braces 36–38 and 40–42, respectively. An axle 44 normal to the longitudinal axis of the tongue 30 is connected to the depending surface of the side members 32 and 34 by bearings 46 and journals, at its respective ends, a pair of pneumatic tire equipped wheels 48. The frame 14 is connected to selected ones of the studs 24 by a plurality of braces 50 extending between the respective frame members and the depending end portion of the studs 24. As shown in FIG. 3, the wheels 48 are positioned within a wheel housing 52 formed in diametrically opposite side portions of the body 12 so that a peripheral portion of the respective wheel 48 projects downwardly beyond the horizontal plane formed by the depending end portion of the body 12 thus supporting the device in a mobile manner. Tongue braces 54 and 56 are connected to one end of the frame 14 and extend forwardly of the body 12 in converging relation and are connected at their forward ends to opposing sides of the tongue 30 forming an A-shaped trailer hitch connecting means. A conventional trailer hitch 58 is connected to the forward end of the tongue 30 and braces 54 and 56. A threaded bolt or shaft extends vertically through the tongue 30 adjacent the trailer hitch 58 to form a support 60 to maintain the trailer frame horizontal when the body 12 is stationary. A guard or bumper 62 is connected to the opposite or rearward end of the tongue 30 outwardly of the barrel. Similarly, a second support 64, threadedly connected with the rearward end portion of the tongue 30, cooperates with the wheels 48 and forward support 60 in maintaining the body bottom end horizontal.

The body 12 is provided with a substantially rectangular access opening 70 which is opened and closed by upper and lower panels or doors 72 and 74, respectively. The upper door 72 is connected to the body 12 at the upper limit of the opening 70 by a hinge 76 for vertical swinging movement of the door 72 about a horizontal axis in opening and closing the opening 70. An inverted V-shaped brace 78 is hingedly connected, as at 80, to the inwardly directed surface of the door 72 while the free end portions of the legs thereof are removably inserted within holes or recesses 82 formed in the vertical side walls of the body 12 defining the access opening 70 to support the door 72 in a generally horizontal plane normal to the vertical axis of the body 12 when the door is in opened position thus forming a sunshade. The lower door 74 is connected by a pair of hinges 84 for horizontal swinging movement of the lower door 74 about a substantially vertical axis. The door 74 normally remains closed, as shown in FIG. 1.

Horizontally aligned grooves or slots 86, formed in the body walls defining the vertical sides of the opening 70, adjacent the upper limit of the door 74, slidably receive a horizontally disposed panel forming a dispensing counter or shelf 88 when the upper door 72 is in opened position. The opposite side edges 88a and 88b of the counter 88, nested by the grooves 86, converge toward the vertical axis of the body 12 so that any force applied to the outwardly disposed edges of the counter tend to wedge the latter more firmly in place. Conversely, the counter 88 is easily removed by manually forcing it horizontally outward. When the device is not in use, the counter 88 is stored within the body 12 and the upper door 72 is connected to the lower door 74 by a latch member 90.

A second rectangular dispensing window or opening 92 is formed in an opposite side portion of the body 12 in spaced relation above one of the wheels 48 and its housing 52. The opening 92 is similarly provided with an opening and closing door or panel 94 hingedly connected to the body 12 at the upper limit of the opening 92, as at 96. A pair of door supports or braces 98 are removably received by their respective ends by suitable slots or recesses formed in the inner wall of the door 94 and the respective vertical side walls of the body 12 forming the opening 92. Similarly a second counter or dispensing platform 100 is removably received by horizontally aligned slots 102 formed in the body walls defining the opening 92 at the lower limit thereof. The door 94 is similarly closed by a latch or catch 104 when the device is not in use.

An inspection plate or panel 106 is hingedly connected to the body 12 at the upper limit of the respective wheel housing 52 for vertical swinging movement to provide access to the wheels 48. The panels 106 are normally maintained in closed position by catches or latch means 108.

Obviously the invention is susceptible to some change or alteration without defeating its practicability, and I therefore do not wish to be confined to the preferred embodiment shown in the drawings and described herein, further than I am limited by the scope of the appended claim.

I claim:

A mobile concession stand, comprising: a substantially hexagonal shaped frame having a central tongue forming a trailer hitch; a frame leveling support connected with the respective end portion of said tongue; a pair of wheels connected to opposing sides of said frame; a downwardly open upright wooden barrel shaped body mounted on said frame in surrounding relation with respect to the wheels and frame sides, said body having an outer wall composed of a plurality of staves forming the barrel shape, said body having an inner substantially cylindrical wall above said frame; a plurality of studs interposed between the inner and outer walls of said body forming a heat and cold insulating space therebetween, said body having rectangular door openings through its walls above said frame and having a wheel access opening in the depending portion of its wall outwardly of each respective said wheel; frame braces connecting the sides of said frame to the depending ends of said studs; a floor overlying said frame within the inner wall of said body; a door hingedly connected to said body above each opening for vertical swinging movement in opening and closing the openings, said doors each having outer and inner surfaces complemental with respect to the outer and inner walls of said barrel shape; door brace members connected with each respective door and removably connected with the wall of said body forming the opening for holding said door in a plane normal to the vertical axis of said body to form a sunshade; a panel hingedly connected to said body at the upper limit of the respective wheel access opening, each said panel having an outer surface complemental with respect to the outer wall of said barrel shape; and a horizontally disposed counter removably supported by the wall of said body forming the respective opening.

References Cited by the Examiner

UNITED STATES PATENTS

| | | | |
|---|---|---|---|
| D. 163,351 | 5/1951 | Bartholomew | 296—22 |
| 618,634 | 1/1899 | Young | 296—21 |
| 1,711,202 | 4/1929 | Jacobs | 296—21 |
| 2,413,164 | 12/1946 | Boldt | 296—22 |
| 2,771,318 | 11/1956 | Jagsch | 296—22 |

FOREIGN PATENTS 442,156   3/1927   Germany.

BENJAMIN HERSH, *Primary Examiner.*

P. GOODMAN, *Assistant Examiner.*